July 4, 1961 W. HENSON 2,990,775

COOLING SYSTEM BASED ON THERMOELECTRIC PRINCIPLES

Filed Feb. 24, 1958

INVENTOR
West Henson
BY
S. Stephen Baker
ATTORNEY 2,990,775
Patented July 4, 1961

2,990,775

COOLING SYSTEM BASED ON THERMO-ELECTRIC PRINCIPLES

West Henson, 833 E. 228th St., Bronx, N.Y.

Filed Feb. 24, 1958, Ser. No. 717,194
9 Claims. (Cl. 102—49)

This invention relates to cooling systems and more particularly to such a system based upon thermoelectric principles.

As will be shown hereinafter, the invention is adaptable to different environments. For example, it is well adapted toward the field of rocketry. According to present practice as it is understood, the problem of securing the greatest push on a rocket involves the generation of as much heat as possible or practical. However, while fuels are available which develop tremendous heat, they cannot be used presently since they would melt the casing of ordinary combustion chambers. Accordingly, it is apparent that structural design of the rocket has been a limiting factor in producing highest effectiveness.

This invention provides a thermoelectric rocket casing which retards an increase in its temperature by generating thermoelectric current in the casing when the casing is heated, such current being arranged to retard the conduction or transfer of the heat to the casing. It will further be recognized that this principle may be employed whether the heat is internally or externally generated. Thus, in a return of the rocket through the atmosphere, the high frictional heat developed may be employed to generate a thermoelectric current which serves to offset the heat.

As a further development of this invention, I amplify the resulting heat retarding effect by connecting the casing into an electric circuit which includes a source of electricity arranged to flow in the same direction as the generated thermoelectric current so that more effective cooling of the casing results. In fact, there need be no self-generated current since the electrical source will supply the required cooling current.

It is further evident that the heat generated thermoelectric current may be employed to operate auxiliary electrical devices within the rocket or to supply other voltages where desirable.

The invention has other uses in general industrial fields such as refrigeration or air conditioning. Thus, I disclose a refrigerator casing which is itself formed of the required two dissimilar metals based upon thermoelectric principles. Such metals are shown as substantially laminated in respect to each other as by plating or otherwise. The two dissimilar metals may be jointly in the form of a hollow body so as to of themselves form a refrigeration chamber and will form part of a thermoelectric circuit in which electric current such as from a battery or other source will produce the required cooling of the body.

The invention will be further understood from the following description and drawings in which:

FIGURE 3 is a similar view of a basic chamber utilizing the above principles but adapted for industrial purposes such as refrigeration or air conditioning or the like.

Figure 1:
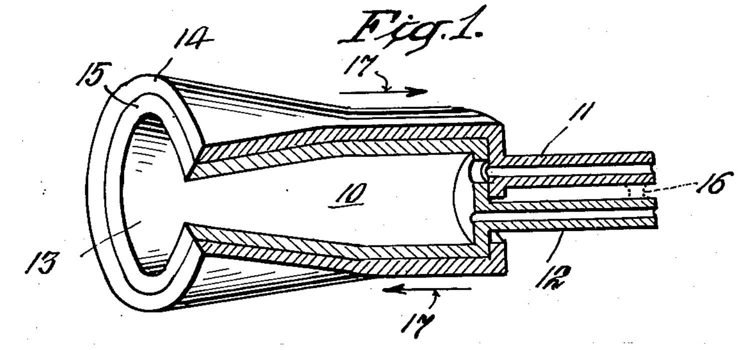
FIGURE 1 is a perspective view partly in section and showing a basic rocket combustion chamber constructed according to the instant invention.

Referring to FIGURE 1, the rocket combustion chamber shown is normally incorporated in a rocket casing as is well understood, the chamber 10 being supplied with fuel and oxidizers through the inlet pipes 11 and 12. The rear opening 13 functions as an exhaust. The body of the combustion chamber comprises laminated walls 14 and 15 of dissimilar metals. These metals may be intersecured by any conventional means such as by riveting, etc. or one may be plated upon the other.

As an example, outside layer 14 may be of nickel while inside layer 15 may be of copper. Fuel inlets 11 and 12 are shown respectively integral with layers 14 and 15 although such integrity is not essential. Fuel inlets 11 and 12 are shown as joined by a metal element 16 so that the entire combustion chamber illustrated forms one end or junction of a thermoelectric circuit which generates thermoelectricity when the chamber is heated, as will be hereinafter described. It will be understood that the provision of element 16 forms an electrical loop or closed circuit wherein the chamber 10 forms one junction of dissimilar metals while element 16 forms the other junction. In this particular form shown, the fuel inlets 11 and 12 represent the two paths between the junctions.

When the fuel is ignited within the combustion chamber 10, the heat generated will be tremendous depending upon the fuels employed. Inasmuch as the rocket chamber illustrated is itself a junction of a thermoelectric circuit as above described, an electric current will be caused to flow in the direction of arrows 17. The reason therefor is that upon the heating of the copper-nickel junction, an electromotive force attributable to the well-known Peltier and Seebeck effects is directed from the copper toward the nickel. In accordance with the Peltier effect, the flow of the current is in such a direction as to tend to cool the junction. Thus, the chamber or casing inherently acts to retard an increase in its temperature by generating thermoelectric current when the casing is heated, such current being in such a direction as to cool the very junction which is being heated.

Metal element 16 has been shown in broken lines since it is not strictly necessary to produce the required thermoelectric circuit unless it is intended to rely upon current which is self-generated from heat within the chamber. However, and as will be shown particularly in connection with FIGURE 3, the current may be supplied by an external source of electricity incorporated in the thermoelectric circuit and arranged to deliver current in a proper direction for producing the cooling effect. Accordingly, element 16 may be effectively replaced by a source of electrical power such as a battery or the like. Alternatively, and as will be evident, such source of current may be in series with the self-generated electrical current produced in the structure of FIGURE 1 so as to be additive thereto.

Figure 2:
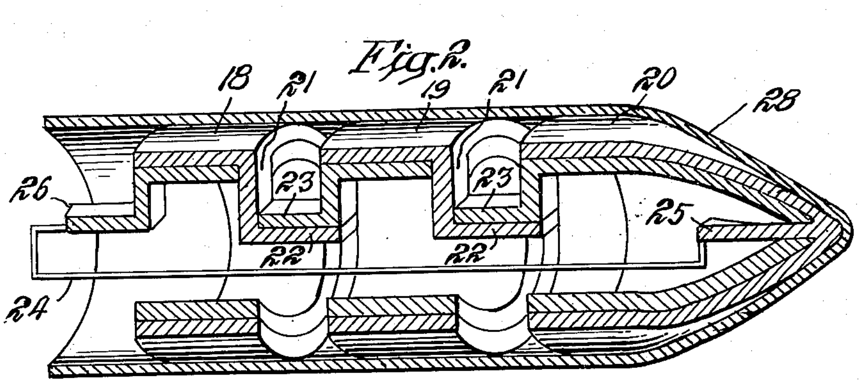
FIGURE 2 is a similar view of a rocket body with thermoelectric sections arranged in series for a greater cooling effect.

In FIGURE 2 is illustrated a nose of a projectile to which may be connected a combustion chamber, not shown. The combustion chamber will include suitable fuel inlets. The thermoelectric circuit comprises a plurality, in this case three thermoelectric outer junctions 18, 19 and 20 arranged in series according to the well-known thermopile principle for producing additive voltages of a higher level. Each junction consists of concentric annular bands laminated one upon the other such as shown in FIGURE 1. In forming the series arrangement, each outer junction is provided with a downward radial arm 21 with a laterally offset step or terminal 22. The terminal 22 is connected to a terminal 23 which in turn is connected by a radial arm to the inner band of the next junction 19. This arrangement is continued throughout the series, the spacing of the junctions from each other being minimal and exaggerated in the drawing to clarify the construction. The bands are annular, being shown broken away to illustrate construction, the terminals 22 and 23 being formed as integral steps projecting from the sides of the bands and being disposed radial inwardly of the bands.

Outer thermoelectric junctions 18, 19 and 20 form the cooled junctions of a closed thermoelectric circuit. The inner steps or terminals 22 and 23 form the opposite junctions. The circuit may be closed by running a bus wire 24 or the like between the respective end terminals 25 and 26 of the circuit. Thus a closed thermoelectric circuit is formed wherein the outer bands constitute the cooled end. Such an arrangement may be referred to as a tubular thermopile with the cooled junctions at the periphery. I use the term "cooled" to indicate the effect of the generated thermoelectric current. Of course, the outer bands will be heated as by frictional resistance of the atmosphere whereby the required cooling or heat offsetting current will be generated, the inner junctions 22 and 23 being relatively cooler.

The rocket may be provided with a jacket 28 of ceramic material such as the well-known Pyroceram material which is currently used for producing the hollow noses of guided missiles.

It will be understood that the structures of FIGURES 1 and 2 are well adapted for satellite or other projectile use since they will tend to be self-cooling by thermoelectric principles pursuant to external heating of the casing by atmospheric or other frictional heat. Further, the devices may be used in successfully recovering or returning the satellite from outer space.

Figure 3:
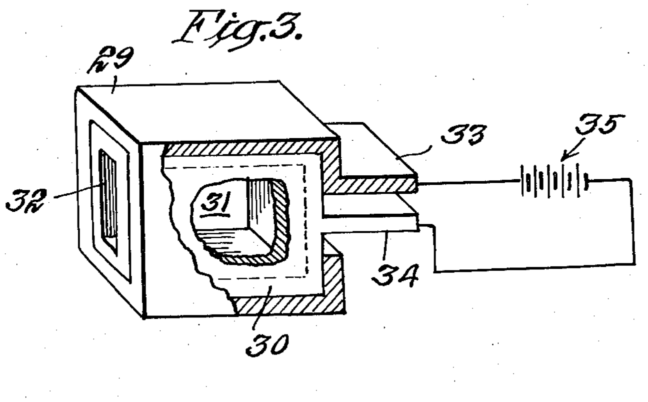

In FIGURE 3 is illustrated a basic unit which may form a refrigerator substantially of itself. This unit comprises two hollow cubes 29 and 30 interfitted one within the other so as to form and define an internal chamber 31 which may function as a container for foods or any other articles to be cooled. The cubes 29 and 30 are, of course, of dissimilar metals according to thermoelectric principles. Thus, cube 29 may be formed of nickel while cube 30 may be formed of copper. The open end 32 of the unit may support a door, not shown.

To the respective terminals 33 and 34 is connected a battery 35 or other source of direct current. The required current flow will be very small, in the order of milliamperes. In accordance with the Peltier effect, the current will cause heat to be absorbed at the junction which is composed of the cubes 29 and 30. Accordingly, this junction will be cooled. The cubes 29 and 30 are of large cross-section, for example, a ⅛" or more each whereby their ohmic resistance is so small as to render negligible heat produced by the Joule effect, the current being restricted to a few milliamperes or so, the resistance of the junction being a small fraction of an ohm. This follows from the fact that the Joule heat is generated at a rate equal to $RI^2$, R being the resistance of the circuit and I the current, while the Peltier effect is developed at a rate proportional to I alone.

It will be further understood that the thermoelectric current generated in FIGURE 2 can be employed for purposes other than cooling the casing. For example, such current may be employed in the electrolysis of water within the combustion section of the rocket so as to produce hydrogen as a fuel and oxygen as an oxidizer. In order to utilize such current the bus wire 24 will be opened and applied to any desired load.

There has been shown what are now considered preferred embodiments of the invention but it is obvious that numerous changes and omissions may be made without departing from its spirit.

What is claimed is:

1. In a rocket having a combustion chamber, a thermoelectric circuit comprised of two junctions, each junction being formed of dissimilar metals, one of said junctions comprising a body formed from laminated walls of said dissimilar metals whereby current flowing through said circuit in a particular direction will tend to cool said body, said body being hollow and defining said combustion chamber, said body having an exhaust opening, and fuel inlet means for said body.

2. A thermoelectric circuit according to claim 1 and wherein said fuel inlet means comprises hollow tubes respectively connected mechanically and electrically to said walls and feeding fuel to said body.

3. A thermoelectric circuit according to claim 2 and wherein said hollow tubes are electrically interconnected so as to form the other of said junctions whereby heat generated by the combustion of said fuel in said body will generate a current in the circuit tending to cool said body.

4. A cooling unit comprising two hollow bodies of dissimilar metals embracing each other and thereby forming a joint hollow chamber, a pair of terminals respectively connected to each of said hollow bodies and forming a thermoelectric circuit therewith, and means to connect a source of electricity to said terminals for producing a current flow in said bodies so as to thermoelectrically cool said chamber.

5. An electrical device comprising two hollow bodies of dissimilar metals one embracing the other and forming therewith a joint hollow chamber, a pair of terminals respectively connected to each of said hollow bodies, and means connecting said terminals together to form a closed thermoelectric circuit with said joint hollow chamber.

6. An electrical device comprising two hollow bodies of dissimilar electric conductive materials, one of said bodies having its outside surface in electrical contact with and enclosed by the other body thereby and both bodies forming jointly a double walled hollow chamber, a pair of terminals respectively connected to each of said hollow bodies and forming a thermoelectric circuit therewith, and means to connect a source of electricity to said terminals to produce an electric current flow in said bodies to thermoelectrically produce like temperature changes in both walls of said chamber.

7. A cooling unit comprising two hollow bodies of dissimilar electric conductive materials, one of said bodies having its outside surface in electrical contact with and enclosed by the other body and both bodies jointly forming a double wall chamber, a pair of terminals respectively connected to each of said hollow bodies and forming a thermoelectric circuit therewith, and a source of direct current connected to said terminals and flowing in a direction so as to produce an electric current flow in said bodies to thermoelectrically cool both walls of said chamber.

8. An electrical device having a thermoelectric junction comprised of two electric conductive walls of respectively dissimilar materials, said walls being laminated one upon the other and both walls jointly forming a chamber, one of said walls having its outside surface in electrical contact with and enclosed by the other wall, and a second junction, said second junction being electrically connected to said first named junction to form a closed thermoelectric circuit.

9. An electrical device according to claim 8 wherein said second junction comprises two terminals which are connected together, and means to apply heat to said chamber walls to generate an electric current in said circuit, whereby both of said chamber walls absorb heat.

References Cited in the file of this patent

UNITED STATES PATENTS

| | | |
|---|---|---|
| 2,468,820 | Goddard | May 3, 1949 |
| 2,749,716 | Lindenblad | June 12, 1956 |
| 2,777,975 | Aigrain | Jan. 15, 1957 |
| 2,844,638 | Lindenblad | July 22, 1958 |

OTHER REFERENCES

Journal of Applied Physics, vol. 18, No. 6, pages 1116–1127, December 1947.